United States Patent [19]

Budzich

[11] 4,074,529
[45] Feb. 21, 1978

[54] LOAD RESPONSIVE SYSTEM PUMP CONTROLS

[76] Inventor: Tadeusz Budzich, 80 Murwood Drive, Moreland Hills, Ohio 44022

[21] Appl. No.: 756,618

[22] Filed: Jan. 4, 1977

[51] Int. Cl.² .................. F16H 39/46; F15B 11/16
[52] U.S. Cl. ........................... 60/445; 60/452; 60/484
[58] Field of Search ............... 60/420, 427, 443, 445, 60/448, 451, 452, 484, DIG. 2

[56] References Cited

U.S. PATENT DOCUMENTS

| | | | |
|---|---|---|---|
| 3,444,689 | 5/1969 | Budzich | 60/427 |
| 3,455,210 | 7/1969 | Allen | 91/446 |
| 3,470,694 | 10/1969 | Budzich | 60/427 |
| 3,858,393 | 1/1975 | Budzich | 60/484 X |
| 3,890,783 | 6/1975 | Allen et al. | 60/484 |
| 3,984,979 | 10/1976 | Budzich | 60/445 |

*Primary Examiner*—Edgar W. Geoghegan

[57] ABSTRACT

A load responsive fluid power control system using servo type flow control valves and fluid motors supplied by a variable displacement pump. The pump displacement is regulated by a control valve in response to the motor load pressure to vary the pump displacement to maintain a constant preselectable ratio between the pump outlet pressure and motor load pressure and to vary the pressure differential between pump outlet pressure and motor load pressure with variation in magnitude of the load. The pump control also limits maximum and minimum system pressures.

36 Claims, 3 Drawing Figures

LOAD RESPONSIVE SYSTEM PUMP CONTROLS

BACKGROUND OF THE INVENTION

This invention relates generally to a load responsive fluid power system using a servo valve in control of a fluid motor driving a load and operated by a variable displacement pump.

In more particular aspects this invention relates to a load responsive fluid power system in which the pump displacement control is regulated in response to a load pressure signal supplied from a fluid motor.

In still more particular aspects this invention relates to a variable displacement pump control which automatically regulates the outlet flow of the pump to maintain a constant preselectable ratio between the pump outlet pressure and servo valve controlled motor load pressure and to vary the pressure differential between the pump outlet pressure and motor load pressure with variation in magnitude of the load.

In still more particular aspects this invention relates to a multiple load system in which the pump control responds to highest system load.

Load responsive fluid power and control systems are very desirable for a number of reasons. They permit load control with reduced power losses and therefore, increased system efficiency and when controlling one load at a time provide a feature of flow control, irrespective of variation in the magnitude of the load. Normally such valves transmit load control signals to the pump control, which automatically maintains pump discharge pressure at a level higher, by a constant pressure differential, than the pressure required to sustain the load. A variable orifice introduced between pump and load varies the flow supplied to the load, each orifice area corresponding to a different flow level, which is maintained constant irrespective of variation in magnitude of the load. Load responsive valves for such a system are disclosed in my U.S. Pat. No. 3,470,694 dated Oct. 7, 1969 and also in U.S. Pat. No. 3,455,210 issued to Allen on July 15, 1969. Load responsive variable displacement pump control for such a system is disclosed in my U.S. Pat. No. 3,444,689 dated May 20, 1969. The universal application of such a system is, however, limited by several basic system disadvantages.

Since this system, to maintain flow characteristics of system valves and to retain high system efficiency, works with a comparatively low constant pressure differential between the pump outlet pressure and the load pressure, the use of the conventional servo type valves in such a system becomes impossible. A servo valve, well known in the art, takes a low energy input and translates it into high energy hydraulic output. Feedback, well known in the art, keeps the hydraulic output of flow or pressure proportional to input signal. It is generally accepted that a servo valve can deliver maximum power to the load when the load differential pressure equals two thirds of the supply pressure. Therefore, neglecting other losses, one third of the system pressure drop occurs across the servo valve. This optimum pressure drop can be influenced by matching servo valve size to the load, but increasing servo valve size increases weight and cost of the system. If the servo valve is too small, the system may become velocity limited during its duty cycle and have poor dynamic response. When the system operates under this condition, a large portion of the pressure drop occurs across the servo valve instead of across the actuator connected to the load, and little useful work is done. The power expended in the servo valve heats the working fluid excessively which is undersirable and inefficient. Maximum system pressure and flow used by the servo valve, in control of a load, is dictated by the most adverse combination of load requirements, which must be satisfied, but which in the average system occur only during a very small percentage of the time and usually do not occur in the normal duty cycle. Due to their basic characteristic servo valves, almost without exception, are used in constant pressure systems, which are supplied by variable displacement pumps controlled by conventional pressure compensator controls, which automatically vary the displacement of the pump to maintain a constant system pressure. The constant pressure level of the system is determined by the size of the servo valve and most adverse combination of load requirements. In consequence the servo valve uses constant maximum pressure in control of a variable load, most of the fluid power energy being converted by throttling into heat, which not only represents system inefficiency, but introduces additional parasitic effects, well known to those skilled in the art. High pressure drops across servo valve when controlling small loads with high system pressure produce many other adverse effects, like change in the gain of the system, high flow forces acting on the valve spools and possible system instability.

SUMMARY OF THE INVENTION

It is therefore a principal object of this invention to provide a load responsive fluid control system, in which a control signal, proportional to magnitude of the load being controlled by a servo valve, is supplied to the variable displacement pump control, to vary system pressure, to maintain a constant ratio between the pump outlet pressure and the pressure necessary to sustain the system load.

Another object of this invention is to select a constant ratio between pump outlet pressure and pressure necessary to sustain a load, controlled by servo valve and vary the system pressure to maintain this ratio constant for optimum operation and response of the servo valve, while limiting pressure drop across the servo valve and increasing system efficiency.

It is another object of this invention, in a system in which multiple loads are being controlled by multiple servo valves, to select individually the best ratio between the pump outlet pressure and pressure necessary to sustain the system load, for each individual servo valve and load system.

It is a further object of this invention, in a system in which multiple loads are being controlled by multiple servo valves, to transmit only the highest of all the load signals, transmitted from all of the system loads, the pump control maintaining a constant preselected ratio between the system pressure and the pressure necessary to sustain the highest system load.

It is a further object of this invention, in a system in which multiple loads are being controlled by servo valves and load responsive direction control valves, to maintain by pump control system pressure either determined by the fixed ratio, associated with the highest load being controlled by system servo valves, or when this system pressure level is lower than that required by the highest system load, controlled by load responsive direction control valves, to maintain, by the pump control, the system pressure higher by a constant pressure differential than the pressure required to sustain the highest load, controlled by load responsive direction control valves.

It is a further object of this invention to provide the pump control with a feature which automatically limits the maximum and minimum system pressure to fixed predetermined values.

Briefly the foregoing and other additional objects and advantages of this invention are accomplished by providing a novel load responsive fluid control system for use during control of multiple loads by servo valves and load responsive direction control valves. A system pump is controlled either in respect to highest pressure signal, transmitted from system servo valves, to maintain system pressure higher, for example, by 30% than pressure necessary to support the highest system load controlled by a servo valve, thus maintaining a constant 1.3 ratio between these pressures, or if the system pressure required by the load controlled by load responsive direction control valves is higher than that required by system servo valve, to maintain automatically the system pressure higher by a constant pressure differential, for example 100 PSI, than the highest system load controlled by system load responsive direction control valves. Pump control automatically limits the maximum system pressure and also limits the minimum system pressure to a level as dictated by, for example, the system stiffness and response characteristics of the system servo valves.

Additional objects of this invention will become apparent when referring to the preferred embodiments of the invention as shown in the accompanying drawings and described in the following detailed description.

DESCRIPTION OF THE PREFERRED EMBODIMENTS

Figure 1:
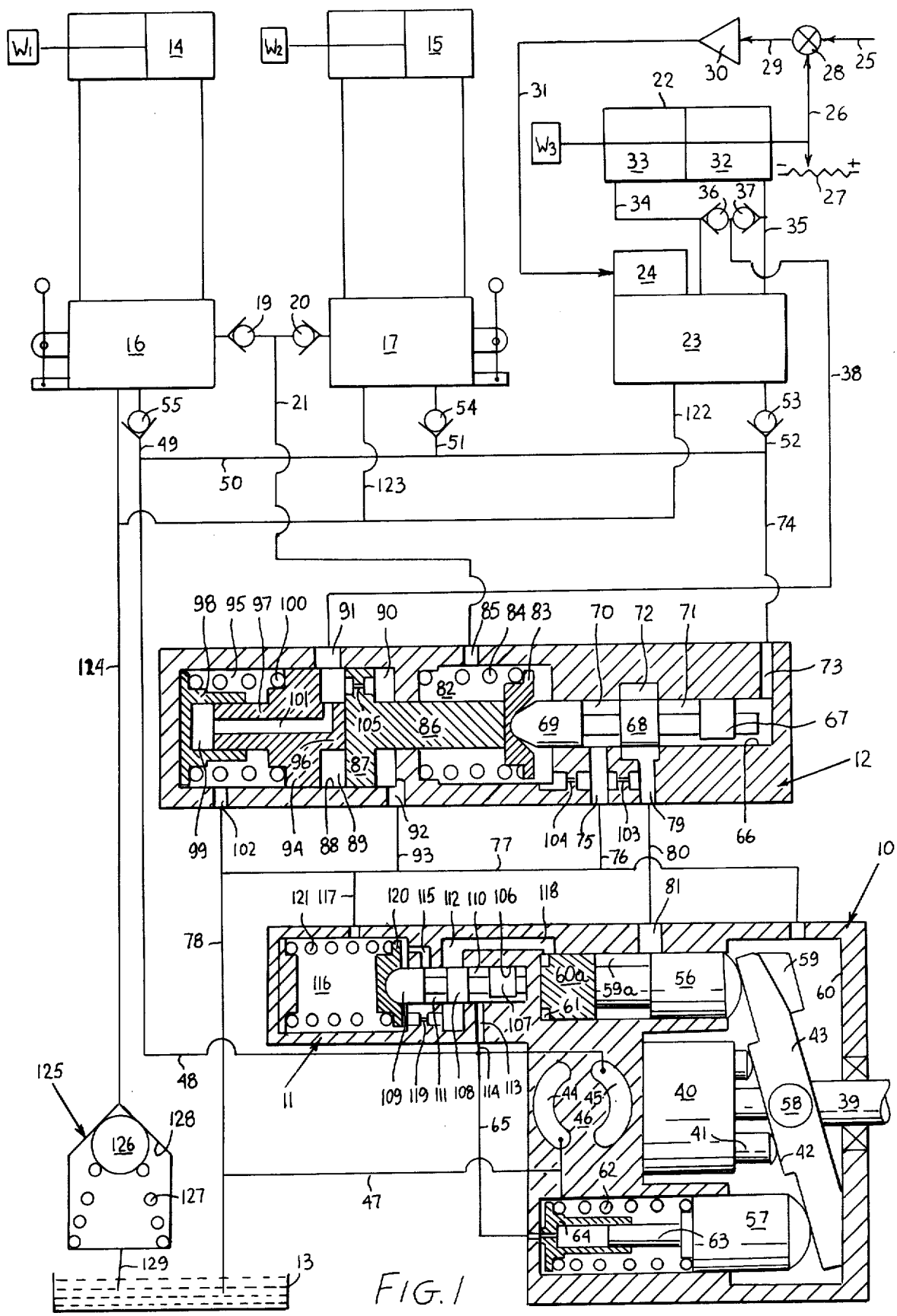
FIG. 1 is a schematic circuit diagram of a multiple load system using servo valves and load responsive direction control valves with pump control responding to the highest system load, while the load signals are transmitted hydraulically.

Referring now to the drawings and for the present to FIG. 1 an embodiment of diagramatically shown variable displacement pump, generally designated as 10 and its controls, generally designated as 11 and 12, is interposed between a system reservoir 13 and system motors controlled by system valves. The variable displacement pump 10 may be of an axial piston type, as shown in FIG. 1, or radial piston type, or vane type, or any other type in which the volume of fluid output per one revolution of the pump can be regulated. Although in the preferred embodiments the system pump is shown as a variable displacement type, a fixed displacement pump, with output flow control of a bypass type, well known in the art, could by used, the pump bypass mechanism being then operated by the pump controls instead of by the variable displacement mechanism of a variable displacement pump.

Fluid motors 14 and 15, operating loads $W_1$ and $W_2$ respectively, are controlled by load responsive flow control valves 16 and 17, which can by manually operated. Load responsive flow control valves may be of a type, as disclosed in my U.S. Pat. No. 3,470,694 dated Oct. 7, 1969 and also in my U.S. Pat. No. 3,984,979 dated Oct. 12, 1976, or any other type which provides load pressure signal to the pump controls. Such valves usually when actuated connect first motor pressure with the pump controls, before connecting the motor with pump and reservoir channels. Load pressure control signals are transmitted from load responsive flow control valves 16 and 17 through a logic system of check valves 19 and 20 and signal line 21 to the pump control 12. In a well known manner only the highest of the load pressures is transmitted through action of check valves 19 and 20 to the pump controls. Load responsive valves usually contain controls which provide fluid flow to the motor, proportional to the valve spool displacement from its neutral position and independent of system pressure. A fluid motor 22, operating a load $W_3$, is controlled by an electro-hydraulic servo valve 23, controlled by a torque motor 24, well known in the art. In a well known manner an electrical command signal 25 and a position feedback signal 26 from a position transducer 27 are subtracted from each other in a differential 28, producing a position error signal 29, which is supplied to a servo amplifier 30, which supplies through line 31 position error signal current to the torque motor 24, thus closing the control loop. Load pressures from the motor chambers 32 and 33 are transmitted through lines 34 and 35 to the check valve logic of check valves 36 and 37, through which only the highest load pressure signal is transmitted to signal line 38 and the pump control 12. In a well known manner, the pressure signals from motor chambers 32 and 33 can be transmitted directly from the servo valve 23, which would then include the check valve logic system. A number of servo valves can be phased to signal line 38 by a check valve logic system, permitting only the highest signal to be transmitted to the pump control 12. The variable displacement pump 10 is driven by a shaft 39, from a prime mover not shown, revolving a cylinder barrel 40, slidably guiding pistons 41, which abut against inclined surface 42 of a swash plate 43. Rotation of the cylinder barrel 40 will induce a reciprocating motion in pistons 41 maintained against inclined surface 42, which will result in a fluid transfer from low pressure port 44 to high pressure port 45, of a diagramatically shown valve plate 46. Low pressure port 44 is connected through suction line 47 with the system reservoir 13. High pressure port 45 is connected through discharge line 48 and lines 49, 50, 51 and 52 with load responsive flow control valves 16 and 17 and the servo valve 23. Load check valves 53, 54 and 55 are positioned in high pressure lines 49, 51 and 52 leading to valves 16, 17 and 23 respectively, to prevent back flow of load pressure into the pump discharge circuit. The swash plate 43 of the variable displacement pump 10 is subjected to forces of a first actuating piston 56 and a second actuating piston 57 and pivots around a pin 58, regulating the output of high pressure fluid from the pump by change in the angle of inclination of the swash plate 43, in respect to the axis of rotation of the cylinder barrel 40. With a stop 59 engaging surface 60 the swash plate 43 assumes a vertical position, corresponding to a zero pump discharge flow. The first actuating piston 56 is subjected to pressure in space 59a and to force developed on area of a transfer piston 60a by pressure in space 61 in a direction to decrease flow output from the pump. The second actuating piston 57 is subjected to the biasing force of a spring 62 and force developed on the cross-sectional area of piston 63 by pump discharge pressure transmitted to a reaction cylinder 64. The reaction cylinder 64 is connected with discharge line 48 by line 65.

The pump control 12 is provided with bore 66 axially guiding a pilot valve spool 67. The pilot valve spool 67, shown in FIG. 1 in a modulating position, has a metering land 68 and a land 69 defining annular spaces 70 and 71. Bore 66 is provided with annular space 72. Annular space 71 is connected through port 73 and line 74 with line 50 and discharge line 48 and therefore is subjected to discharge pressure of the pump 10. Annular space 70 is connected through port 75 and lines 76, 77 and 78 with the system reservoir 13. Annular space 72 is connected through port 79 and line 80 to port 81 communicating with space 59a. The land 69 with its spherical end projects into control space 82 and engages a spring retainer 83, subjected to biasing force of a load spring 84. Control space 82 is connected through port 85 with signal line 21. A plunger 86, connected to a piston 87, projects into control space 82 and selectively engages the spring retainer 83. The piston 87, axially guided in cylinder bore 88, defines annular spaces 89 and 90. Space 89 is connected through port 91 with signal line 38. Space 90 is connected through port 92 and line 93 with lines 77 and 78, leading to the system reservoir 13. The piston 94, in communication with annular space 89, defines annular space 95 and is provided with an extension 96, selectively engaging the piston 87 and a reaction piston 97, which slidably engages a reaction cylinder 98 and defines space 99. A spring 100 is interposed between the piston 94 and the reaction cylinder 98. Space 99 is connected through passage 101 with annular space 89. Annular space 95 is connected through port 102 with line 78 leading to the system reservoir 13. A leakage orifice 103 is interposed between ports 75 and 79. A leadage orifice 104 is interposed between port 75 and control space 82. A leakage orifice 105 is interposed between annular spaces 89 and 90.

The pump control 11 is provided with bore 106 axially guiding a pilot valve spool 107. The pilot valve spool 107, shown in FIG. 1 in an unloading position, has a metering land 108 and a land 109 defining annular spaces 110 and 111. Bore 106 is provided with annular space 112. Annular space 110 is connected through port 113 and line 114 to discharge line 48 and therefore is subjected to discharge pressure of the pump 10. Annular space 111 is connected through passage 115 with space 116, which in turn is connected through line 117 with lines 77 and 78 leading to the system reservoir 13. Annular space 112 is connected through passage 118 with space 61 and through the leakage orifice 119 to space 116. The land 109 with its spherical end projects into space 116 and engages the spring retainer 120, subjected to biasing force of a maximum pressure spring 121. The exhaust circuit of load responsive flow control valves 16 and 17 and the servo valve 23 are connected through lines 122, 123 and 124 to an exhaust pressure relief valve, generally designated as 125, which is provided with a throttling member 126, biased by a spring 127 towards engagement with seat 128. The exhaust pressure relief valve 125 is connected by line 129 with the system reservoir 13.

The variable displacement pump 10, in a well known manner, by changing the angular inclination of the swash plate 43 will proportionally regulate the flow of fluid from low pressure port 44 to high pressure port 45. Low pressure port 44 is connected by suction line 47 to the reservoir 13. High pressure discharge fluid is supplied from high pressure port 45 through discharge line 48 to the fluid power and control system as shown in FIG. 1. The swash plate 43 is biased towards position of its maximum angular inclination and therefore towards position of maximum flow output of the variable displacement pump 10 by the second actuating piston 57, which is subjected to force of the spring 62 and force developed on cross-sectional area of piston 63, by the pressure existing in discharge line 48. The swash plate 43 is biased towards the position of its minimum angular inclination and therefore towards position of minimum flow output of the variable displacement pump 10 by the first actuating piston 56. The first actuating piston 56 is subjected to force developed on its cross-sectional area by pressure in space 59a, or through the action of the transfer piston 60a to the force developed on its cross-sectional area by pressure in space 61. In a well known manner the force generated by the higher of the two pressures, existing in spaces 59a and 61, will be transmitted by the first actuating piston 56 to the swash plate 43. Therefore, by regulating the pressure level in spaces 59a and 61, the angular inclination of the swash plate 43 and therefore the discharge flow of the variable displacement pump 10 can be controlled. Since the pressure level in space 59a is dictated by the pump control 12 and the pressure level in space 61 is dictated by the pump control 11, displacement and output flow of the variable displacement pump 10 can be varied in response to the control pressure transmitted either from the pump control 12 or the pump control 11.

The pump control 11 limits through the control of the angle of inclination of the swash plate 43 the maximum system pressure to a fixed predetermined level and represents a type of control well known in the art as pressure compensator. Assume that the pressure in space 59a is maintained by the pump control 12 at a low level. The pilot valve spool 107, of the pump control 11, is subjected to the force generated by pressure in annular space 110, acting on its cross-sectional area, tending to move it from right to left and the biasing force of the maximum pressure spring 121 tending to move it from left to right. Since annular space 110 is directly connected through port 113 with the pump discharge pressure and since space 116 containing the maximum pressure spring 121 is maintained through lines 117 and 78 at reservoir pressure, the force generated by the pump discharge pressure on the cross-sectional area of the pilot valve spool 107 will overcome the preload in the maximum pressure spring 121 and move the pilot valve spool 107 from right to left. The preload in the maximum pressure spring 121 is so selected that it corresponds to the maximum system pressure to which the system can be subjected. As shown in FIG. 1 the pilot valve spool 107 is maintained by the maximum pressure spring 121 in its extreme position to the right, connecting space 61 through passage 118, annular space 112, annular space 111, passage 115, space 116 and lines 117 and 78 with the system reservoir 13. Therefore the swash plate 43 will remain biased by the second actuating piston 57 at its maximum angular inclination, the variable displacement pump 10 delivering maximum flow to the system. Assume that the pump discharge pressure will increase gradually until it will reach a level, at which, acting on the cross-sectional area of the pilot valve spool 107 it will move the pilot valve spool 107 from right to left against the biasing force of the maximum pressure spring 121, first closing with the metering land 108 communication between annular space 111 and annular space 112 and then gradually connecting annular space 112 with annular space 110, which is subjected to the discharge pressure of the variable displacement pump 10. The pressure in annular space 112, passage 118 and space 61 will increase to a level at which, acting on the cross-sectional area of the transfer piston 60a, it will move the transfer piston 60a and the first actuating piston 56 against the force, developed by the second actuating piston 57, reducing the angular inclination of the swash plate 43 and discharge flow of the variable displacement pump 10, to a level, at which the discharge pressure will begin to drop. The pilot valve spool 107 will move from left to right into a modulating position, in which the metering land 108, in a well known manner, will vary the pressure in space 61, to vary the angular inclination of the swash plate 43, to vary the discharge flow of the variable displacement pump 10, to maintain the maximum discharge pressure of the pump 10 at a constant level, as dictated by the preload in the maximum pressure spring 121. Since a small leakage flow, proportional to pressure in space 61, is induced by the leakage orifice 119 between annular space 112 and space 116, the metering land 108 will assume a modulating position, throttling fluid flow from annular space 110 to annular space 112 and space 61, to vary the flow of the variable displacement pump 10, to maintain the system pressure at a constant maximum pressure level. The leakage orifice 119 is usually introduced to increase control stability. In the intermediate pump discharge pressure range of the variable displacement pump 10, lower than the maximum system pressure, as determined by the preload in the maximum pressure spring 121, the pump control 11 is completely inactive, maintaining the pressure in space 61 at reservoir pressure, permitting operation of the pump control 12. Once, however, the system pressure, as dictated by the pump control 12, will reach the maximum pressure control setting of the pump control 11, the pump control 11 automatically takes over, varying the displacement of the variable displacement pump 10, to maintain system pressure at this maximum level, until the pump control 12 will lower the system pressure to a level, below pressure setting of the pump control 11, at which time the pump control 11 becomes inactive and system pressure is controlled by the pump control 12.

The pump control 12 has an annular space 72 connected through port 79, line 80 and port 81 with space 59a. The pump control 12, by controlling pressure in annular space 72 and therefore in space 59a, through the action of the first actuating piston 56, in a manner as previously described, controls the displacement of the variable displacement pump 10. The metering land 68 of the pilot valve spool 67 is shown in its modulating position, in which it controls the pressure in annular space 72 by connecting it either to annular space 70, which is maintained through port 75, lines 76, 77 and 78 at reservoir pressure, or to annular space 71, which is connected through port 73 and lines 74, 50 and 48 with the pump high pressure port 45 and therefore maintained at pump discharge pressure. The pilot valve spool 67 is subjected on one end to force of discharge pressure, acting on its cross-sectional area tending to move the pilot valve spool 67 from right to left and to the sum of a number of forces, tending to move the pilot valve spool 67 from left to right. The sum of these forces is composed of the biasing force of the spring 84, acting on the spring retainer 83, the biasing force of the spring 100 transmitted through the piston 94, the extension 96, the piston 87, the plunger 86 to the spring retainer 83, the force due to pressure in control space 82, acting on cross-sectional area of the pilot valve spool 67 and the force equal to the difference between the product of the cross-sectional area of piston 87 and pressure in annular space 89 and product of cross-sectional area of the plunger 86 and the pressure in space 82.

Assume that the pressure in control space 82 and in annular space 89 is very low. Then the pilot valve spool 67 is subjected to force developed by pump discharge pressure acting on its cross-sectional area opposed by combined biasing force of springs 84 and 100. Under these conditions pump control 12 acts as a conventional compensator and is identical in its control action to pump control 11, regulating the pressure in space 59a to vary the displacement of the variable displacement pump 10, to maintain a constant discharge pressure of the variable displacement pump 10 at a level as dictated by the combined preload of springs 84 and 100. The combined preload of springs 84 and 100 is so selected that the resulting constant system pressure is at a minimum level to satisfy the requirements of load responsive flow control valves 16 and 17 and the servo valve 23. Therefore with control space 82 and annular space 89 maintained at minimum pressure the pump control 12 will act as a pressure compensator, automatically maintaining pump discharge pressure at a certain preselected minimum constant pressure level.

Assume that load responsive flow control valves 16 and 17 are actuated. In a manner as previously described, the highest load pressure is transmitted through check valves 19 and 20 to signal line 21, which is connected through port 85 with control space 82. Assume also that the pressure in annular space 89 is maintained at a low pressure level. Increasing pressure in control space 82 will react on the cross-sectional area of pilot valve spool 67, tending to increase the combined force acting on the pilot valve spool 67. At the same time, increasing pressure in control space 82, will react on the cross-sectional area of the plunger 86 and will subtract an equivalent force from the biasing force of the spring 100, transmitted to the pilot valve spool 67. If the cross-sectional areas of the plunger 86 and the pilot valve spool 67 are selected the same, the effects of increasing pressure in control space 82 on the force acting on the pilot valve spool 67 will cancel each other, until control space 82 is subjected to high enough pressure to completely balance the biasing force effect of the spring 100. This will occur at a pressure level in control space 82, which is smaller than the minimum controlled system pressure by a pressure, equal to the quotient of biasing force of the load spring 84 and the cross-sectional area of the pilot valve spool 67. Any further increase in load pressure signal in control space 82 will result, through the control action of the pilot valve spool 67 and an adjustment in displacement of the variable displacement pump 10, in an identical increase in the discharge pressure of the variable displacement pump 10, the discharge pressure of the pump being always higher by a constant pressure differential, equal to the quotient of the biasing force of the load spring 84 and the cross-sectional area of the pilot valve spool 67 than the load signal pressure transmitted through signal line 21. Therefore the pump control 12, in absence of control signal from the servo valve 23 and while load responsive flow control valves 16 and 17 are being operated, will always maintain a constant pressure differential between the discharge pressure of the variable displacement pump 12 and the highest of the load pressure signals transmitted from the load responsive flow control valves 16 and 17. This constant pressure differential is normally selected at the lowest value which will still permit the operation of the flow controls of the load responsive flow control valves 16 and 17. The leakage orifice 104 is provided between control space 82 and port 75 to permit displacement of the fluid, caused by the motion of the pilot valve spool 67 from right to left, when check valves 19 and 20 are closed.

Assume that load responsive flow control valves 16 and 17 are inactive, with control space 82 maintained at minimum pressure level, while the highest load pressure signal is transmitted from motor chambers 32 and 33 through check valves 36 and 37 and signal line 38 to the port 91, communicating with annular space 89 and while discharge pressure of the variable displacement pump 10 is maintained by the pump control 12 at a minimum pressure level. Increasing load signal pressure in annular space 89 will react on the cross-sectional area of piston 87, which is made larger by a certain selected ratio than the cross-sectional area of the pilot valve spool 67. Therefore the effect of the pressure increase in annular space 89 will be amplified by this fixed area ratio and result in a force balance on the pilot valve spool, which will increase the discharge pressure of the variable displacement pump 10, to maintain approximately the same fixed ratio between discharge pressure of the variable displacement pump 10 and the load signal pressure in annular space 89. This fixed pressure ratio will be attained at a pressure level in annular space 89, at which the force developed on the effective area of the piston 94 will balance the preload in the spring 100. The effective area of the piston 94 equals the difference in areas of the piston 94 and the reaction piston 97. With passage 101 blocked and space 99 vented to annular space 95 the effective area of the piston 94 would equal the cross-sectional area of the piston 94. Therefore the pressure level in annular space 89, at which the fixed pressure ratio between pump discharge pressure and load signal pressure in annular space 89 is attained, will depend both on preload of the spring 100 and effective area of the piston 94. Minimum controlled system pressure, as dictated by the combined biasing force of springs 84 and 100, in respect to the cross-sectional area of the pilot valve spool 67, is selected to provide the servo valve 23 with a minimum pressure level, irrespective of how small the controlled load is, for proper response characteristics and system stiffness. Depending on the type of the system and of the servo valve this minimum pressure level may be comparatively high. The preload in the spring 84 is dictated by the constant pressure differential, as required by the load responsive flow control valves 16 and 17 and is usually comparatively low, in some instances as low as or even lower than 50 PSI. Therefore most of the biasing force, to provide minimum controlled system pressure, must be supplied by the spring 100. Until the preload in the spring 100 is balanced by the load pressure signal in annular space 89, the pump discharge pressure is equal to the quotient of the sum of all forces transmitted to the pilot valve spool 67 in direction to move it from left to right and the cross-sectional area of the pilot valve spool 67. Once the preload in the spring 100 is balanced by the load pressure signal in annular space 89, the pump discharge pressure equals the pressure of the load signal multiplied by area ratio between the piston 87 and the pilot valve spool 67 plus a pressure differential due to the preload in the spring 84. Since, in a manner as previously described, the pressure differential due to preload in the spring 84 is selected small, once the preload in the spring 100 is balanced by load signal pressure in annular space 89, a relatively constant ratio is maintained by pump control 12 between the discharge pressure of the variable displacement pump 10 and the load signal pressure, transmitted through signal line 38 from the motor 22, controlled by the servo valve 23. The leakage orifice 105 is provided between the annular space 89 and annular space 90 to permit fluid displacement from annular space 89 during motion of piston 87 from right to left, while check valves 36 and 37 are closed. In a manner as previously described it is generally accepted that servo valve can deliver maximum power to the load, when the load differential pressure equals two thirds of the supply pressure. Therefore neglecting other losses one third of the system pressure drop occurs across the servo valve. Depending on the size of the servo valve, load characteristics and required response of the system, the constant ratio of amplification between the pump pressure and the load signal pressure may be selected, for example, from 1.3 up to 2 or higher. Since the pump control 12 varies the system pressure to maintain a preselected ratio between pump discharge pressure and signal pressure of a load controlled by a servo valve, great savings in power and heat input into the working fluid can be obtained when compared to the losses in a conventional constant pressure system.

Assume that load pressure signals are simultaneously transmitted from load responsive flow control valves 16 and 17 and from the servo valve 23. Since before reacting against the pilot valve spool 67 the load pressure signal from the servo valve 23 is amplified, the pump control 12 will automatically respond to the highest signal comparing the amplified control signal, from the load controlled by servo valve and an unamplified signal from load responsive flow control valves. The force developed on the piston 87 by the load signal pressure from the motor 22, controlled by the servo valve 23, is opposed by the force developed on the plunger 86 by pressure in control space 82, due to load pressure signal transmitted from load responsive flow control valves 16 and 17. If amplified force from the piston 87 is higher than the force developed on the plunger 86, the difference between these two forces is transmitted to the pilot valve spool 67. Since the pilot valve spool 67 is also subjected to the pressure in control space 82, the pump control 12 will respond to the load pressure signal from the motor 22, maintaining a relatively constant ratio between pump discharge pressure and load signal pressure. If the amplified force from the piston 87 is lower than the force developed on the plunger 86, the plunger 86 will move out of contact with the spring retainer 83 and the pump control 12 will respond to the highest load signal, transmitted from the load responsive flow control valves 16 and 17, providing the discharge pressure at a level, higher by a constant pressure differential, than the load signal pressure.

The discharge pressure from the variable displacement pump 10 is supplied to load responsive flow control valves 16 and 17 and to the servo valve 23 through load check valves 53, 54 and 55 which, in a well known manner, prevent back flow from the valves to the system pump. The exhaust flow from the valves is passed through the exhaust relief valve 125, which maintains the exhaust system pressurized. This condition is sometimes beneficial to the operation of load responsive flow control valves 16 and 17. If more than one servo valve is used in a system, in a well known manner, a check valve logic is used to phase the highest load pressure signal to annular space 89 where, in a manner as previously described, it is amplified by a fixed ratio and transmitted to the pump controller.

Figure 2:
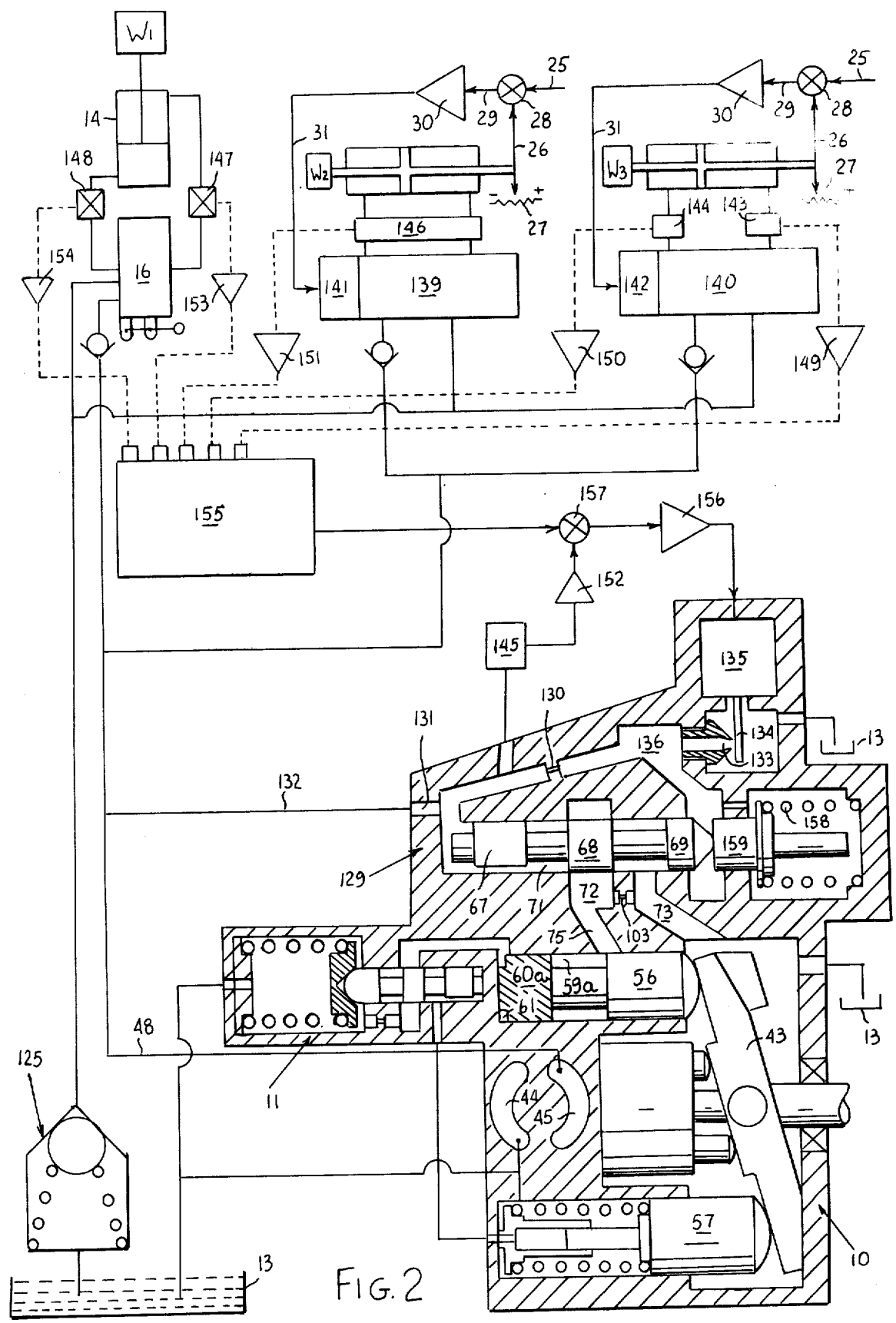
FIG. 2 is a schematic circuit diagram of another embodiment of a multiple load system using servo valves and load responsive direction control valves with pump control responding to the highest system load, while the load signals are transmitted electrically.

Referring now to FIG. 2 another embodiment of a multiple load system, employing servo valves and a load responsive flow control valve, using different type of servo pump control, generally designated as 129, is shown. The system of FIG. 2 uses the same variable displacement pump 10 and the same maximum pressure pump compensator control 11 as shown in FIG. 1. The systems of FIGS. 1 and 2 also perform in a very similar way, since the controls of the variable displacement pump 10 automatically maintain the levels of the maximum and minimum system pressure. In the intermediate pressure zone the variable displacement pump controls of FIGS. 1 and 2 automatically maintain a relatively constant preselectable ratio between pump discharge pressure and control signal, proportional to maximum system load pressure, from loads controlled by servo valves. The pump controls of FIGS. 1 and 2 also automatically maintain pump discharge pressure at a level higher, by a constant pressure differential, than control signal proportional to highest load pressure, transmitted from the system load responsive flow control valves when this highest control signal is higher than the highest control signal, amplified by a constant ratio and delivered from the loads operated by system servo valves. The fluid power amplifiers of FIGS. 1 and 2, regulating the displacement mechanism of the variable displacement pump are again identical and the controls of maximum and minimum system pressure are mechanical and are either identical or based on the same principle. The basic difference between the systems of FIGS. 1 and 2 is that in FIG. 1 load pressure signals, passed through a check valve logic system, are directly used in operation of a fluid power amplifier which controls output of system pump in response to these pressure signals. On the other hand in FIG. 2 pressure or load control signals from system loads, operated by servo valves or load responsive flow control valves, are converted by suitable transducers into proportional electrical signals, amplified, fed into an electrical logic circuit, which passes only the highest load signal and transmitted to the servo valve, which converts this highest electrical signal into a proportional pressure signal.

Figure 3:
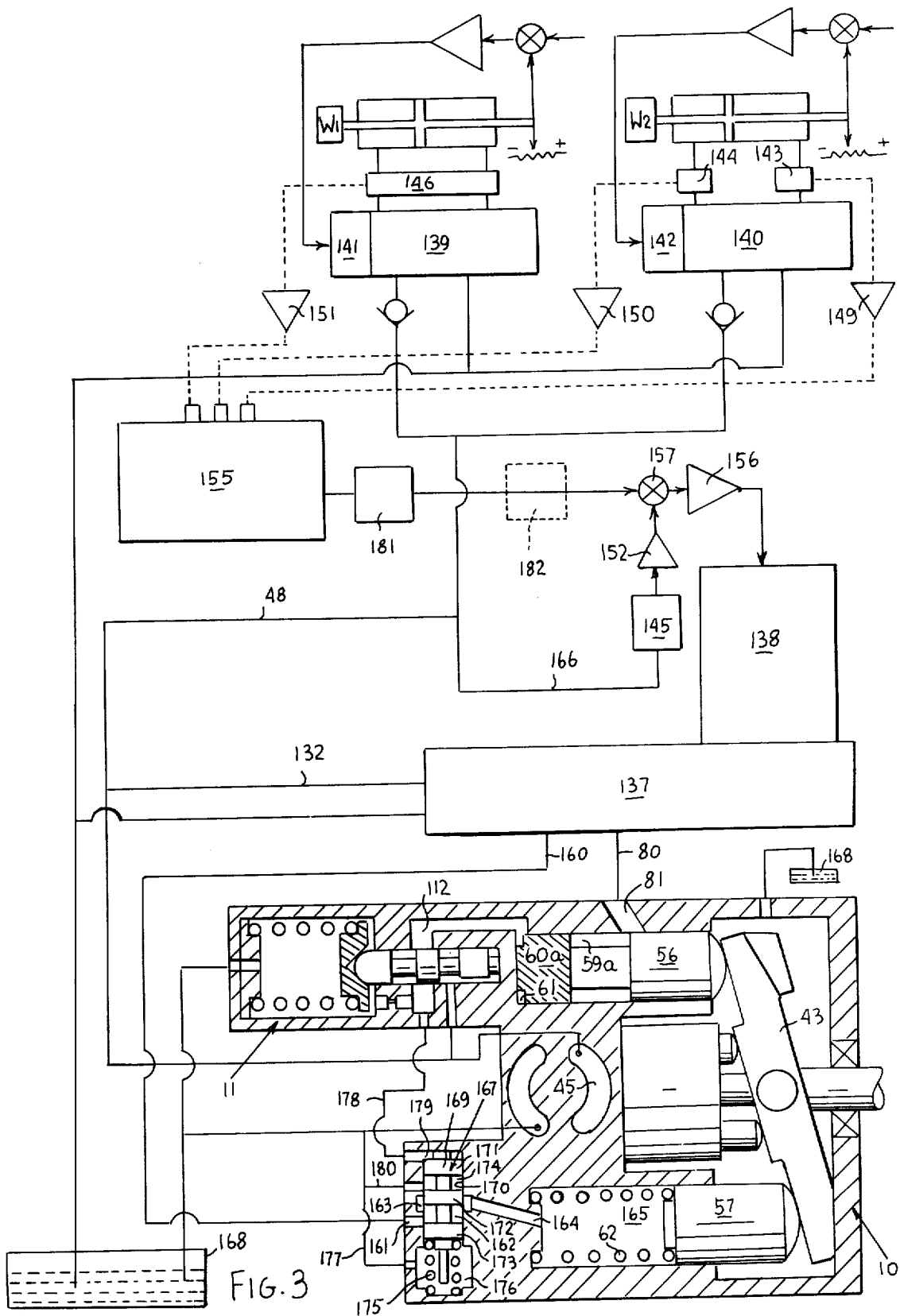
FIG. 3 is a schematic circuit diagram of still another embodiment of a multiple load system using servo valve in control of loads and a servo valve in control of pump displacement responding to the highest system load, while the load signals are transmitted electrically.

An electro-hydraulic servo valve, well known in the art, takes a low energy electrical input and translates it into high energy hydraulic output. Some early designs used an electric torque motor armature, directly connected to a spool of a hydraulic valve and supplied all power to move it. Such a valve is called a single stage valve in contrast to later developments, which added a second stage of hydraulic amplification, or so called pilot operation. Various designs can be used for the second stage. Cascading a larger second stage spool valve with the first stage of amplification gives higher power levels. Feedback, well known in the art, keeps output flow or pressure proportional to input signal. A two stage servo valve development, that gained wide acceptance, is the combination of first stage using a nozzleflapper combination, as a hydraulic amplifier and a spool output stage. An electrical input signal into torque motor produces a proportional output pressure from the first stage hydraulic amplifier. This pressure is used to drive the output spool. Such a first stage hydraulic amplifier is used in the servo pump control 129. The first stage has a fixed upstream orifice 130 connected through port 131 and lines 132 and 48 to the high pressure port 45 of the variable displacement pump 10 which provides the source of pressure and a nozzle type down stream orifice 133, resistance of which is varied by position of a flapper 134 in relation to the nozzle orifice 133. The flapper 134 is operated by a torque motor 135 which usually consists of a polarized solenoid energized by a coil. The pressure in chamber 136, positioned between the upstream orifice 130 and the nozzle orifice 133, which are in series, is applied to one end of the pilot valve spool 67. The servo valve can have a single nozzleflapper hydraulic amplifier of an unbalanced type, in which first stage pressure is ported to one end of the output spool. Such a servo valve is shown in FIG. 2. operating through the pilot valve spool 67 the flow changing mechanism or the swash plate 43 of the variable displacement pump 10. Double nozzle balanced type servo valves have two sets of opposing orifices and nozzles and transmit first stage amplified pressure signal to both ends of the output spool. In FIG. 3 a servo valve 137 of such a type, operated by a torque motor 138, can be used to control the flow of variable displacement pump 10. Similar type servo valves 23, 139 and 140 operated by torque motors 29, 141 and 142 of FIGS. 1, 2 and 3 can be used in closed loop system controlling loads W.

Pressure transducer, well known in the art, is a device which converts pressure signal into a proportional electrical signal, usually providing an output voltage proportional to system pressure. Such transducers 143, 144 and 145 are shown in FIG. 2. Pressure transducers use many types of transducing elements, strain gauge being one of them and can provide not only a signal proportional to direct pressure, but also a signal proportional to differential pressure. Differential pressure transducer, providing a signal proportional to differential pressure across an actuator, will also provide a signal, which is proportional to system load, operated by the actuator. Such a transducer 146 is shown in FIG. 2. Load signal can also be obtained, as is well known in the art, by a load cell, which directly reacts to the loads developed by the actuator. Pressure transducer may include a device, for example in the form of a spring, applying a constant force on the transducing element in the same direction as the direction of the force being measured. Such a pressure transducer will provide a pressure signal, which equals the sum of a variable pressure signal, proportional to the variable load and a constant signal proportional to the magnitude of the constant force developed in the transducer. Therefore a transducer of this type will provide a signal proportional to the load or pressure and higher by a constant differential than the load or pressure actually developed in the system. Such transducers 147 and 148 are shown in FIG. 2. If for example the output of the transducer is a voltage signal, the same effect can be produced, when using a conventional type pressure transducer in combination with an electrical network, composed of components well known in the art, which would continuously add constant voltage to the variable output signal, supplied from the pressure transducer. A well known summation type amplifier could be used for this purpose.

An electrical signal, proportional to system load or pressure, is supplied to signal amplifiers 150, 151, 152, 153 and 154. Signal amplifiers are instrument type of operational amplifiers, well known in the art, which amplify a relatively weak electrical control signal, by a fixed preselectable ratio, into a proportional higher strength signal. Low strength electrical control signal is usually in the form of variable voltage. These amplifiers, at different preselectable ratios of amplification, amplify electrical signals, proportional to load or pressure, from different types of pressure or load transducers. The amplified signals from transducers 143, 144, 146, 147 and 148 are transmitted to logic circuit 155, or logic comparator system, which by using signal comparators and gates, well known in the art, compares the strength of all incoming command signals and permits only the highest of these signals to pass through. Such a logic circuit could be assembled from many types of components well known in the art and can be made to operate with weak command signals, in micro-volt range, or with higher strength or amplified signals. The highest amplified signal from the logic circuit 155 is supplied to a servo amplifier 156. Servo amplifier, well known in the art, usually includes a command and feedback signal differential 157, feeding an error signal, which is equal to the difference between command and feedback signals, into forward path amplifier, which provides torque motor control current to the torque motor 135. Feedback pressure signal of pump discharge pressure, sensed by the pressure transducer 145 and amplified by the signal amplifier 152, is supplied to the differential 157. Therefore in a well known manner control signal, proportional to the difference between signal transmitted from the logic circuit 155 and feedback signal, which constitutes an error signal, is supplied from the servo amplifier 156 to the torque motor 135. In a manner as previously described the flapper 134 will vary pressure in chamber 136, in respect to the error signal supplied from the servo amplifier 156. The pilot valve 67 is subjected on one side to the pressure developed in chamber 136 and to biasing force of the spring 158, transmitted through a piston 159. With pressure in chamber 136 at a very low level, corresponding to a very low control signal to torque motor 135, the pilot valve spool 67, biased by the spring 158, will perform in a manner as previously described, when referring to FIG. 1, as a conventional pressure compensator control, automatically maintaining constant preselectable minimum pressure in chamber 136 and therefore in pump discharge port 45, by varying the displacement of the variable displacement pump 10. Rising pressure in chamber 136 will react on cross-sectional area of the pilot valve spool 67, tending to increase the system pressure. A further increase in the pressure in chamber 136, in a manner as previously described, will automatically increase, by an equal amount, the discharge pressure level of the variable displacement pump 10, by regulating output flow of the pump.

In the system as shown in FIG. 2 the signal amplifiers 149, 150 and 151, amplifying signals from transducers 143, 144 and 146, which provide signals proportional to pressure or loads operated by servo valves 139 and 140, are operating at higher amplification ratio then signal amplifiers 152, 153 and 154. The amplification ratio of signal amplifiers 153 and 154 and total system balance is so selected that the pump control will provide a discharge pressure, higher by a constant pressure differential, than the load pressure, developed in the load responsive flow control valve 16 provided that the load pressure signal, transmitted from the load responsive flow control valve 16, is the highest of all the signals transmitted to the logic circuit 155. The same amplification ratio is used in signal amplifier 152. The amplification ratio of signal amplifers 149, 150 and 151 is selected higher than that of amplifiers 153 and 154 by a ratio which may vary, for example, from 1.3 to 2 or higher. In this way a constant preselectable ratio can be maintained between pump discharge pressure and load pressure of a load operated by a servo valve, provided that the amplified signal from this load is the highest of all the signals transmitted to the logic circuit 155.

Referring now to FIG. 3, in a manner as previously described when referring to FIG. 2, the servo valve 137 may be of a double nozzle balanced type, well known in the art, having two sets of opposing orifices and nozzles and transmitting first stage amplified pressure signal to both ends of the output spool. The high energy hydraulic output from the output spool is transmitted through line 80 and port 81 to space 59a, where it reacts on the cross-sectional area of the first actuating piston 56. The high energy hydraulic output is also supplied from the output spool and transmitted through line 160, port 161, annular spaces 162 and 163 and passage 164 to space 165, where it reacts against cross-sectional area of the second actuating piston 57. The first stage of the servo valve 137 is operated, in a manner as previously described, by the torque motor 138, responsive to the error signal from the servo amplifier 156. In a manner as previously described, the highest signal is transmitted from the logic circuit 155 to the differential 157, which normally is part of the servo amplifier 156. The differential 157 is also supplied with a feedback signal from system discharge pressure. The feedback signal from the transducer 145, connected through line 166 and line 48 to the high pressure port 45 of the variable displacement pump 10, is supplied to the signal amplifier 152 and the differential 157. The differential 157, in a well known manner, transmits the error signal to the servo amplifier 156.

The variable displacement pump 10 is essentially the same as that in FIGS. 1 and 2, the only difference being the elimination of the piston 63 and the reaction cylinder 64 from the space 165, while the biasing spring 62 supplies a biasing force to the second actuating piston 57. The variable displacement pump 10 is also provided with an unloading valve, generally designated as 167. The pump control 11, limiting the maximum system pressure, is identical to that of FIGS. 1 and 2 and performs in an identical way. In the intermediate pressure range, below the maximum system pressure, in a manner as previously described when referring to FIG. 1, the pump control 11 maintains annular space 112 and space 61 at the pressure of a closed system reservoir 168, which may be of a boot strap type, well known in the art and maintains the reservoir pressure at a level, higher than atmospheric pressure. The unloading valve 167 is provided with a spool 169, guided in a bore 170. The spool 169 has lands 171, 172 and 173, defining annular spaces 162 and 174. Bore 170 is provided with annular space 163. The spool 169 is biased by a spring 175, positioned in space 176, which communicates through line 177 with the system reservoir 168. Annular space 112 of pump control 11 is connected by line 178 with control space 179. In a manner as previously described, during normal operation of the pump control in its intermediate zone of discharge pressure, the servo valve 137 is directly connected through port 161, annular spaces 162 and 163 and passage 164 to space 165. This line of communication is maintained open by spool 169 of unloading valve 167, biased by the spring 175. However, once the maximum discharge pressure of the system is reached, the pump control 11 will increase the pressure in annular space 112 and space 61. This increased pressure, transmitted through line 178 to control space 179, will move the spool 169 downwards, against the bias of the spring 175, with land 172 cutting off the servo valve 137 from space 165 and connecting space 165, through annular space 174 and line 180, to the system reservoir 168. The spring 62, through the second actuating piston 57, will tend to increase displacement of the variable displacement pump 10, while the pump control 11, in a manner as previously described when referring to FIG. 1, will regulate the displacement of the pump, to maintain the maximum system pressure at its preselected constant level. The operation of the pump control 11, while the load signals of the system demand pressure higher than the maximum system pressure, will not be affected by the servo valve 137 since, under these conditions, while responding to high load signal, the servo valve 137 will maintain the space 59a at a low pressure level and the high energy signal, transmitted from the servo valve 137 through line 160 is blocked from space 165 by the spool 169 of the unloading valve 167.

The basic performance of a multiple load system using the servo valves of FIG. 3, is similar to that of FIG. 2. The pump control will automatically maintain the highest system pressure at a fixed predetermined level and will maintain a constant preselected ratio between the pump discharge pressure and the maximum pressure from the load $W_1$ or $W_2$, operated by the servo valves, as determined by the amplification ratio from the signal amplifiers 149, 150 and 151. Those amplifiers permit matching of ratio of the pump discharge pressure to load pressure, as required by the characteristics of any specific servo valve, or required characteristics of the system response, while conserving energy and reducing the heat input into the system's working fluid, thus providing better control characteristics and a more efficient system than conventional constant pressure system.

In FIG. 3 the control signal, transmitted from the logic circuit 155 is passed through a control device 181, containing an electronic network composed of components well known in the art, which supplies a constant minimum level control signal, equivalent to minimum selected system pressure, only when the variable control signal from the logic circuit 155 drops below this minimum control signal level. This minimum control signal, in a manner as previously described, will establish, through the existing control circuit of the variable displacement pump 10, minimum controlled pump discharge pressure, as required for the desired response of servo valves 137, 139 and 140.

Control signal, delivered from the control device 181, may be passed through a control device 182, shown in dotted lines, which without appreciably modifying the control signal in a range, equivalent to the working pressure range of the variable displacement pump 10, limit the control signal to maximum value, equivalent to pressure just below maximum system pressure, as determined by the setting of the pump control 11, which maintains the maximum system pressure level at a fixed predetermined value. The control device 182 may for example use a Zener diode, acting as a control element, to limit the maximum voltage of the control signal, or contain an electronic network of other components well known in the art. In a manner as previously described the control device 182 will establish, through the existing control circuit of the variable displacement pump 10, the maximum system working pressure, equivalent to maximum control signal as determined by the control device 182. Then the mechanical pump control 11 becomes an auxiliary overriding control, automatically limiting the maximum system pressure and maintaining it at a constant predetermined level, protecting the system pump during malfunction of system controls and converting the system to a constant pressure system at the maximum system pressure level. The servo valve 137, as shown in FIG. 2, can be supplied through discharge line 48 with the discharge pressure of the variable displacement pump 10 or from a separate small pump, equipped with a constant pressure control and connected to reservoir 168.

Although the preferred embodiments of this invention have been shown and described in detail it is recognized that the invention is not limited to the precise form and structure shown and various modifications and rearrangements as will occur to those skilled in the art upon full comprehension of this invention may be resorted to without departing from the scope of the invention as defined in the claims.

What is claimed is:

1. A fluid power and control system comprising a fluid pump, a fluid motor driving a load, and valve means interposed between said pump and said motor to control said load, flow changing means operable to vary fluid flow delivered from said pump to said fluid system to vary pressure in said fluid system, first control means having means operable to limit through said flow changing means maximum pressure of said system to a fixed predetermined level, second control means having means operable to limit through said flow changing means minimum pressure of said system to a fixed predetermined level, control signal generating means to generate a control signal proportional to magnitude of said load, and third control means responsive to said control signal having means operable through said flow changing means to maintain a preselectable relatively constant ratio between pressure of said fluid system and pressure necessary to support said load and to vary pressure differential between pressure of said fluid system and pressure necessary to support said load with variation in magnitude of said load.

2. A fluid power and control system as set forth in claim 1 wherein said first control means has means responsive to pressure in said system.

3. A fluid power and control system as set forth in claim 1 wherein said second control means has means responsive to pressure in said system.

4. A fluid power and control system as set forth in claim 1 wherein said first control means has deactivating means of said third control means to deactivate said third control means when said maximum pressure of said system reaches said maximum predetermined level.

5. A fluid power and control system as set forth in claim 1 wherein said control signal generating means includes load pressure sensing duct means to transmit a load pressure signal to said third control means.

6. A fluid power and control system as set forth in claim 5 wherein said third control means has fluid control valve means having means responsive to said load pressure signal and said system pressure and operable to divert fluid flow and pressure from said pump means to actuating means of said flow changing means.

7. A fluid power and control system as set forth in claim 6 wherein a preselectable constant ratio force amplifying means responsive to said load pressure signal is interposed between said pressure sensing duct means and said fluid control valve means, said fluid control valve means having means responsive to said force amplifying means and said system pressure and operable to divert fluid flow and pressure from said pump to said actuating means of said flow changing means to vary flow of said pump to maintain a preselectable relatively constant ratio between pressure of said fluid system and pressure necessary to support said load and to vary pressure differential between pressure of said fluid system and pressure necessary to support said load with variation in magnitude of said load.

8. A fluid power and control system as set forth in claim 1 wherein said control signal generating means includes first transducer means having means to convert a mechanical signal proportional to load into a first proportional electrical signal.

9. A fluid power and control system as set forth in claim 8 wherein said third control means includes a second transducer means having means to convert said first electrical signal supplied from said first transducer means into pressure signal, fluid control valve means responsive to said pressure signal and operable to divert fluid flow and pressure from said pump to actuating means of said flow changing means to vary flow of said pump to control pressure of said system proportional to magnitude of said electrical signal.

10. A fluid power and control system as set forth in claim 9 wherein an electrical signal amplifying means is interposed between said first transducer means and said second transducer means operable to maintain a preselectable constant ratio between force of said variable load and pressure delivered by said pump to said fluid motor driving said load.

11. A fluid power and control system as set forth in claim 9 wherein said third control means includes a third transducer means having means to convert pump pressure into a proportional second electrical signal and feedback means to combine said first and said second electrical signals and to transmit an error signal to said second transducer.

12. A fluid power and control system as set forth in claim 9 wherein said first control means has deactivating means of said third control means to deactivate said third control means when said maximum pressure of said system reaches said maximum predetermined level.

13. A fluid power and control system as set forth in claim 1 wherein said third control means has pressure limiting means responsive to said control signal operable to limit through said flow changing means pressure of said system to a level lower by a preselected value than said fixed predetermined maximum pressure level of said first control means.

14. A fluid power and control system comprising a fluid pump, plurality of fluid motors driving loads, and valve means interposed between said pump and each of said motors to control each load, flow changing means operable to vary fluid flow delivered from said pump to said fluid system to vary pressure in said fluid system, first control means having means operable to limit through said flow changing means maximum pressure of said system to a fixed predetermined level, second control means having means operable to limit through said flow changing means minimum pressure of said system to a fixed predetermined level, control signal generating means to generate a control signal proportional to magnitude of each load, control signal phasing means operable to receive all of said control signals and to pass only the highest signal from the highest system load, and third control means responsive to said highest control signal having means operable through said flow changing means to maintain a preselectable relatively constant ratio between pressure of said fluid system and pressure necessary to support said highest system load and to vary pressure differential between pressure of said fluid system and pressure necessary to support said highest load with variation in the magnitude of said highest load.

15. A fluid power and control system as set forth in claim 14 wherein said first control means has means responsive to pressure in said system.

16. A fluid power and control system as set forth in claim 14 wherein said second control means has means responsive to pressure in said system.

17. A fluid power and control system as set forth in claim 14 wherein said control signal generating means includes load pressure sensing duct means to transmit load pressure signal from each load to said third control means, and check valve means in each of said duct means whereby only the highest of load pressure signals is transmitted from highest load to said third control means.

18. A fluid power and control system as set forth in claim 14 wherein said first control means has deactivating means of said third control means to deactivate said third control means when said maximum pressure of said system reaches said maximum predetermined level.

19. A fluid power and control system as set forth in claim 17 wherein said third control means has fluid control valve means having means responsive to said highest load pressure signal and said system pressure and operable to divert fluid flow and pressure from said pump means to actuating means of said flow changing means.

20. A fluid power and control system as set forth in claim 19 wherein a preselectable constant ratio force amplifying means responsive to said highest load pressure signal is interposed between said pressure sensing duct means transmitting said highest load signal and said fluid control valve means, said fluid control valve means having means responsive to said force amplifying means and said system pressure and operable to divert fluid flow and pressure from said pump to said actuating means of said flow changing means to vary flow of said pump to maintain a preselectable relatively constant ratio between pressure of said fluid system and pressure necessary to support said highest load and to vary pressure differential between pressure of said fluid system and pressure necessary to support said highest load with variation in the magnitude of said load.

21. A fluid power and control system as set forth in claim 14 wherein said control signal generating means has load transducer means operably connected to each fluid motor driving a load, said load transducer means having means to convert a mechanical control signal proportional to load into an electrical control signal proportional to load.

22. A fluid power and control system as set forth in claim 21 wherein said third control means includes a second transducer means having means to convert said highest electrical control signal proportional to load supplied from said load transducer means operably connected to fluid motor driving highest load into pressure signal, fluid control valve means responsive to said pressure signal and operable to divert fluid flow and pressure from said pump to an actuating means of said flow changing means to vary flow of said pump to control pressure of said system proportional to the magnitude of said highest electrical control signal.

23. A fluid power and control system as set forth in claim 22 wherein an electrical signal amplifying means is interposed between said control signal phasing means and said second transducer means, said second transducer means operable to maintain a preselectable constant ratio between force of said highest load and pressure delivered by said pump to said fluid motor driving said highest load.

24. A fluid power and control system as set forth in claim 22 wherein an electrical signal amplifying means is interposed between each of said load transducer means and said control signal phasing means operable to maintain a preselectable constant ratio between magnitude of the electrical load signal delivered from each load to said signal phasing means and magnitude of said electrical load signal generated by said load transducer means.

25. A fluid power and control system as set forth in claim 22 wherein said third control means includes a third transducer means having means to convert pump pressure into a proportional second electrical signal and feedback means to combine said highest electrical load signal transmitted from said load transducer operably connected to motor driving the highest load and said second electrical signal and to transmit an error signal to said second transducer.

26. A fluid power and control system as set forth in claim 25 wherein said first control means has deactivating means of said third control means to deactivate said third control means when said maximum pressure of said system reaches said maximum predetermined level.

27. A fluid power and control system as set forth in claim 14 wherein said third control means has pressure limiting means responsive to said highest control signal operable to limit through said flow changing means pressure of said system to a level lower by a preselected value than said fixed predetermined maximum pressure level of said first control means.

28. A fluid power and control system comprising a fluid pump, at least one fluid motor having a fluid inlet chamber and a fluid outlet chamber driving a load, and servo valve means interposed between said pump and said motor to control said load, flow changing means operable to vary fluid flow delivered from said pump to said fluid system to vary pressure in said fluid system, first control means responsive to pressure in said system operable to limit through said flow changing means maximum pressure in said system, second control means responsive to pressure in said system operable to limit through said flow changing means minimum pressure of said system to a fixed predetermined level, control signal generating means having load pressure sensing means operable to transmit load pressure signal and third control means having fluid control valve means, said fluid control valve means having means responsive to said load pressure signal and said system pressure and operable through said flow changing means to maintain a preselectable relatively constant ratio between pressure of said fluid system and pressure necessary to support said load and to vary pressure differential between pressure of said fluid system and pressure necessary to support said load with variation in magnitude of said load.

29. A fluid power and control system as set forth in claim 28 wherein said first valve means has deactivating means of said third control means to deactivate said third control means when said maximum pressure of said system reaches said maximum predetermined level.

30. A fluid power and control system as set forth in claim 28 wherein said load pressure sensing means include pressure sensing duct means interposed between said fluid inlet chamber and said third control means and said fluid outlet chamber and said third control means and check valve means in each of said duct means, whereby only the highest of load pressure signals is transmitted from said inlet chamber or from said outlet chamber to said third control means.

31. A fluid power and control system as set forth in claim 30 wherein said fluid control valve means has means operable to limit through said flow changing means minimum pressure of said system to a fixed predetermined level.

32. A fluid power and control system comprising a fluid pump and a plurality of fluid motors driving loads, servo valve means interposed between said pump and each of said motors, flow changing means operable to vary flow delivered from said pump to said fluid system to vary pressure in said fluid system, control signal generating means operable to generate an electrical signal proportional to magnitude of each of said loads, amplifying means to amplify each of said electrical signals by a ratio as determined by characteristics of each of said servo valve means, control signal phasing means operable to receive all of said amplified control signals from said plurality of motors controlling loads and to pass only the highest of all of all of said signals, first control means having means operable to limit through said flow changing means maximum pressure of said system to a fixed predetermined level, second control means having means operable to limit through said flow changing means minimum pressure of said system to a fixed predetermined level and third control means responsive to said highest control signal transmitted from said control signal phasing means operable through said flow changing means to maintain a preselectable relatively constant ratio between pressure of said fluid system and pressure necessary to support load transmitting said highest control signal.

33. A fluid power and control system as set forth in claim 32 wherein said first control means includes limiting means of said highest control signal to limit said highest control signal to a fixed predetermined level.

34. A fluid power and control system as set forth in claim 32 wherein said second control means includes minimum signal level control means operable to prevent said highest control signal from dropping below a level as determined by said minimum signal level control means.

35. A fluid power and control system comprising a fluid pump, first plurality of fluid motors driving loads, servo valve means interposed between said pump and each of said motors, second plurality of fluid motors driving loads, direction control valve means interposed between said pump and each of said motors, flow changing means operable to vary fluid flow delivered from said pump to said fluid system to vary pressure in said fluid system, first control means having first valve means responsive to pressure in said system operable to limit through said flow changing means maximum pressure of said system to a fixed predetermined level, second control means responsive to pressure in said system operable to limit through said flow changing means minimum pressure of said system to a fixed predetermined level, first control signal generating means having load pressure sensing means operable to transmit load pressure signals from loads controlled by said servo valve means, first control signal phasing means operable to receive all of said load pressure control signals from said first control signal generating means and to pass only the highest load pressure signal from the highest load, highest control signal amplifying means to amplify said highest signal, second control signal generating means having load pressure sensing means operable to transmit load pressure signals from loads controlled by said direction control valve means, second control signal phasing means operable to receive all of said load pressure control signals from said second control signal generating means and to pass only highest load pressure signal from the highest load, third control means having second valve means, said second valve means having first means responsive to said amplified 'highest load pressure signal from said first control signal generating means operable through said flow changing means to vary pressure differential between pressure of said fluid system and pressure necessary to support the highest load from said first plurality of fluid motors in proportion to magnitude of said highest load when said amplified highest load pressure signal from said first control signal generating means is higher than said highest load pressure signal from said second control signal generating means, said second control valve means having second means reponsive to said highest load pressure signal from said second control signal generating means operable through said flow changing means to maintain a relatively constant pressure differential between pressure of said fluid system and pressure necessary to support the highest load from said second plurality of fluid motors when said highest load pressure signal from said second control signal generating means is higher than said amplified highest load pressure signal from said first control signal generating means, and deactivating means to deactivate said third control valve means when said first control means limits said maximum pressure of said system.

36. A fluid power and control system comprising a fluid pump and first plurality of fluid motors driving loads, servo valve means interposed between said pump and each of said motors, second plurality of fluid motors driving loads, direction control valve means interposed between said pump and each of said motors, flow changing means operable to vary fluid flow delivered from said pump to said fluid system to vary pressure in said fluid system, first control means operable to limit through said flow changing means maximum pressure of said system to a fixed predetermined level, second control means operable to limit through said flow changing means minimum pressure of said system to a fixed predetermined level, first control signal generating means operable to generate electrical signals proportional to magnitude of each load driven by said first plurality of fluid motors, first amplifying means to amplify each of said electrical signals by a fixed predetermined ratio preselectable for each load, second control signal generating means operable to generate an electrical signal higher by a constant preselectable value than a signal proportional to magnitude of each load driven by said second plurality of fluid motors, second amplifying means to amplify each of said electrical signals by a fixed ratio for each load lower than amplification ratio of said first amplifying means, control signal phasing means operable to receive all of said amplified control signals from said first and second signal generating means and to pass only the highest of all of said signals, and third control means responsive to said highest electrical load signal, said third control means including a transducer means having means to convert said highest electrical load signal into control pressure signal, fluid control valve means responsive to said control pressure signal and operable to divert fluid flow and pressure, from said pump to an actuating means of said flow changing means to vary flow of said pump to control pressure of said system proportional to the magnitude of said highest electrical load signal, to vary pressure differential between system pressure and pressure necessary to sustain highest load driven by said first plurality of fluid motors in proportion to magnitude of said highest load when highest amplified signal is transmitted from said first control signal generating means, and to maintain a relatively constant pressure differential between system pressure and pressure necessary to sustain highest load driven by said second plurality of fluid motors when highest amplified signal is transmitted from said second control signal generating means.

* * * * *